July 3, 1934.  G. AURIEN  1,965,065
APPARATUS FOR SCORING CORRUGATED GLASS SHEETS
Filed Oct. 19, 1932
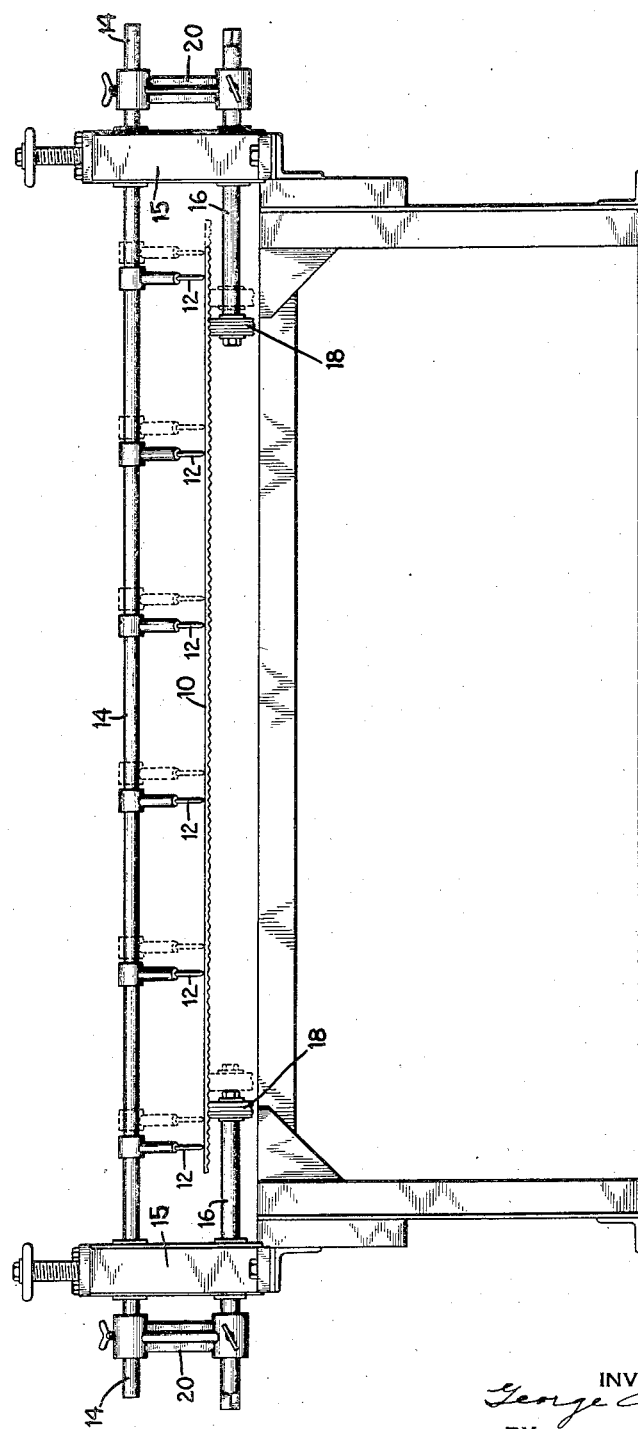

Patented July 3, 1934

1,965,065

UNITED STATES PATENT OFFICE 1,965,065

APPARATUS FOR SCORING CORRUGATED GLASS SHEETS

George Aurien, St. Louis County, Mo., assignor to Mississippi Glass Company, New York, N. Y., a corporation of New York Application October 19, 1932, Serial No. 638,559

4 Claims. (Cl. 33—32)

In the manufacture of corrugated glass for use in washboards and the like, it is customary to roll the glass in comparatively wide ribbons or sheets and then cut the sheets to size after they pass through the lear.

The glass may have a smooth upper surface and a corrugated under surface or both surfaces may be corrugated, the corrugations running substantially parallel to the direction of motion of the sheet. The present invention pertains to the cutting of the sheets parallel to the corrugations.

It is found in practice that the ribbon as it issues from the lear weaves somewhat from side to side, and it is the object of this invention to disclose means for causing the longitudinal scoring tools to keep in line with the corrugations.

The drawing shows the apparatus with the sheet travelling towards the observer.

The sheet 10 is supported in the usual manner on rollers, not shown, and travels underneath the scoring tools 12 which score the upper surface of the sheet in parallel lines marking the boundaries of the comparatively narrow sheets into which the original wide sheet is to be divided.

The scoring tools are supported on a bar 14 slidably mounted in the upper part of pedestals 15. Slidably mounted in pedestals 15 below bar 14, and parallel therewith, are bars 16. These latter bars carry on their inner ends freely rotatable rollers 18 having circumferential corrugations corresponding to the corrugations in the glass sheet. The rollers cannot move axially relatively to bars 16. Bars 16 are so located that the corrugations of the rollers engage the corrugations of the sheet, therefore, as the travelling sheet weaves from side to side rollers 18 and bars 16 also move sidewise in harmony with the sheet. Bars 16 are connected to bar 14 by rigid members 20, therefore the back and forth movements of bars 16 are communicated to bar 14, thus forcing tools 12 to travel parallel to the corrugations in the glass.

The glass, as illustrated, has a smooth upper surface and corrugated under surface but it may be run with the upper side corrugated and the under side smooth, or both surfaces may be corrugated. If the upper surface is corrugated rollers 18 may be above the sheet instead of below. The scoring tools may operate on either the upper or lower surface.

A subsequent operation fractures the sheet on the scored lines.

It is to be understood that the invention is not limited to the specific embodiment herein illustrated and described, but may be used in other ways without departure from its spirit as defined by the following claims:

1. Apparatus for longitudinally scoring a sheet of glass having a corrugated surface, while the sheet is moving in a direction substantially, but not exactly, parallel to the corrugations, comprising in combination, a scoring tool, means for supporting said tool to score a line on the surface of the moving sheet, and means automatically controlled by the moving sheet for adjusting the position of said tool sidewise of the sheet whereby said line is scored parallel to said corrugations.

2. Apparatus for longitudinally scoring a sheet of glass having a corrugated surface, while the sheet is moving in a direction substantially, but not exactly, parallel to the corrugations, comprising in combination, a scoring tool, means for supporting said tool to score a line on the surface of the moving sheet, and means operable by the corrugations of the moving sheet for automatically adjusting the position of said tool sidewise of the sheet whereby said line is scored parallel to said corrugations.

3. Apparatus for longitudinally scoring a sheet of glass having a corrugated surface, while the sheet is moving in a direction substantially, but not exactly, parallel to the corrugations, comprising in combination, a scoring tool, means for supporting said tool to score a line on the surface of the moving sheet, a roller adapted to enter corrugations in the sheet, means for supporting said roller in engagement with the corrugations, and means for interconnecting said roller and said tool supporting means whereby said tool is constrained to score said line parallel to said corrugations.

4. Apparatus for longitudinally scoring a sheet of glass having a corrugated surface, while the sheet is moving in a direction substantially, but not exactly, parallel to the corrugations, comprising in combination, a scoring tool, a bar above said sheet and movable crosswise thereof for supporting said tool to score a line on the surface of the moving sheet, a roller adapted to enter corrugations in the sheet, a bar movable parallel to said tool supporting bar for supporting said roller in engagement with the corrugations, and means for interconnecting said bars whereby said roller moves said bars axially, thus forcing said tool to score said line parallel to said corrugations.

GEORGE AURIEN.